T. KIHLGREN.
GRINDING AND REDUCING APPARATUS.
APPLICATION FILED OCT. 13, 1913.
1,098,325.
Patented May 26, 1914.
3 SHEETS—SHEET 1.
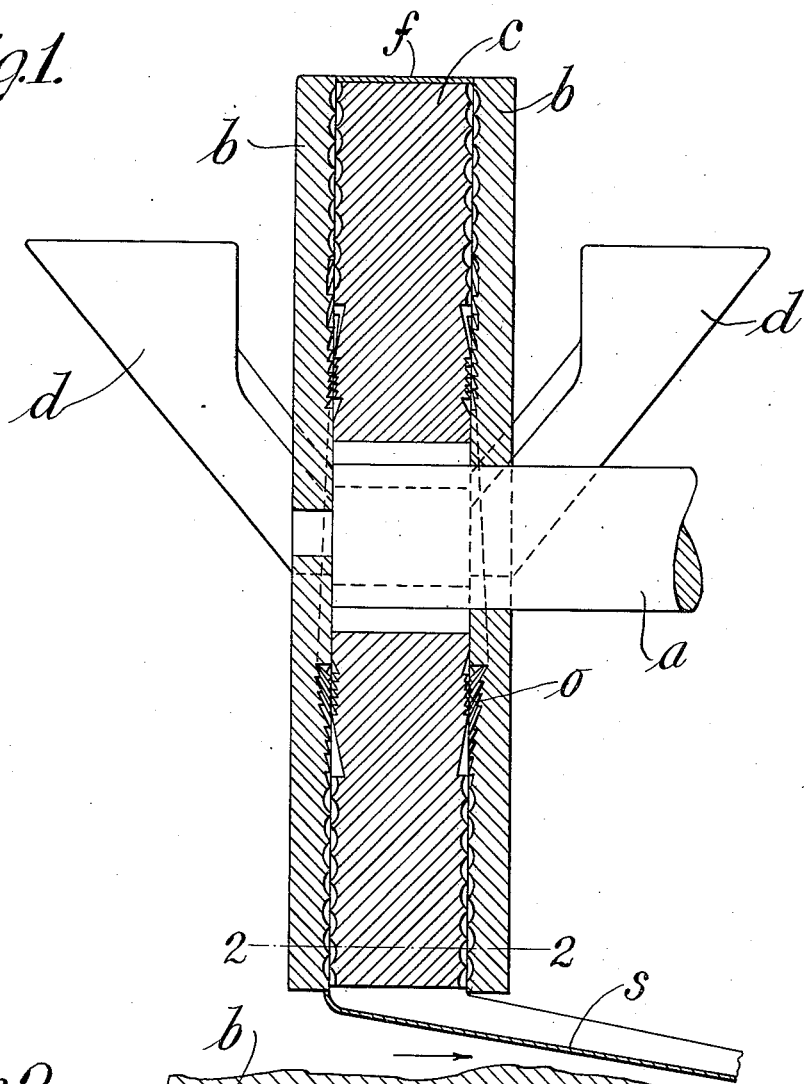
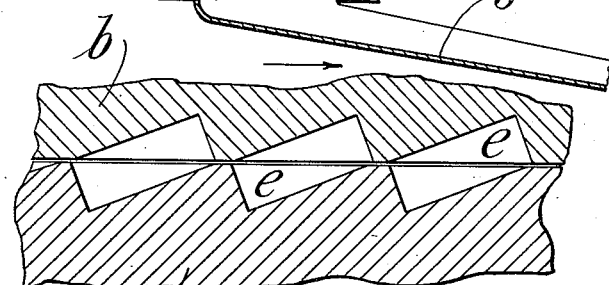
WITNESSES:
INVENTOR.
Theodor Kihlgren.
BY
Chapin & Co.
ATTORNEY.

T. KIHLGREN.
GRINDING AND REDUCING APPARATUS.
APPLICATION FILED OCT. 13, 1913.

1,098,325.

Patented May 26, 1914.
3 SHEETS—SHEET 2.

WITNESSES:
F. E. Hartwell
Caroline W. Willis

INVENTOR.
Theodor Kihlgren.
BY
Chapin Hey
ATTORNEY.

T. KIHLGREN.
GRINDING AND REDUCING APPARATUS.
APPLICATION FILED OCT. 13, 1913.

1,098,325.

Patented May 26, 1914.

3 SHEETS—SHEET 3.

WITNESSES:
F. C. Hartwell.
Caroline N. Willis

INVENTOR.
Theodor Kihlgren.
BY
Chapin & Co.
ATTORNEY.

UNITED STATES PATENT OFFICE.

THEODOR KIHLGREN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

GRINDING AND REDUCING APPARATUS.

1,098,325. Specification of Letters Patent. Patented May 26, 1914.

Application filed October 13, 1913. Serial No. 794,871.

*To all whom it may concern:*

Be it known that I, THEODOR KIHLGREN, a citizen of the United States of America, residing at Springfield, in the county of Hampden and State of Massachusetts, have invented new and useful Improvements in Grinding and Reducing Apparatus, of which the following is a specification.

This invention relates to a grinding or reducing apparatus and more particularly to grinding disks for use in such apparatus by which it is desired to reduce the cocoa bean used in manufacturing chocolate.

The object of the invention is to provide disks which will reduce the cocoa bean to a desired fineness in an efficient manner.

With this object in view, the invention will be described in connection with the accompanying drawings in which—

Figure 3:
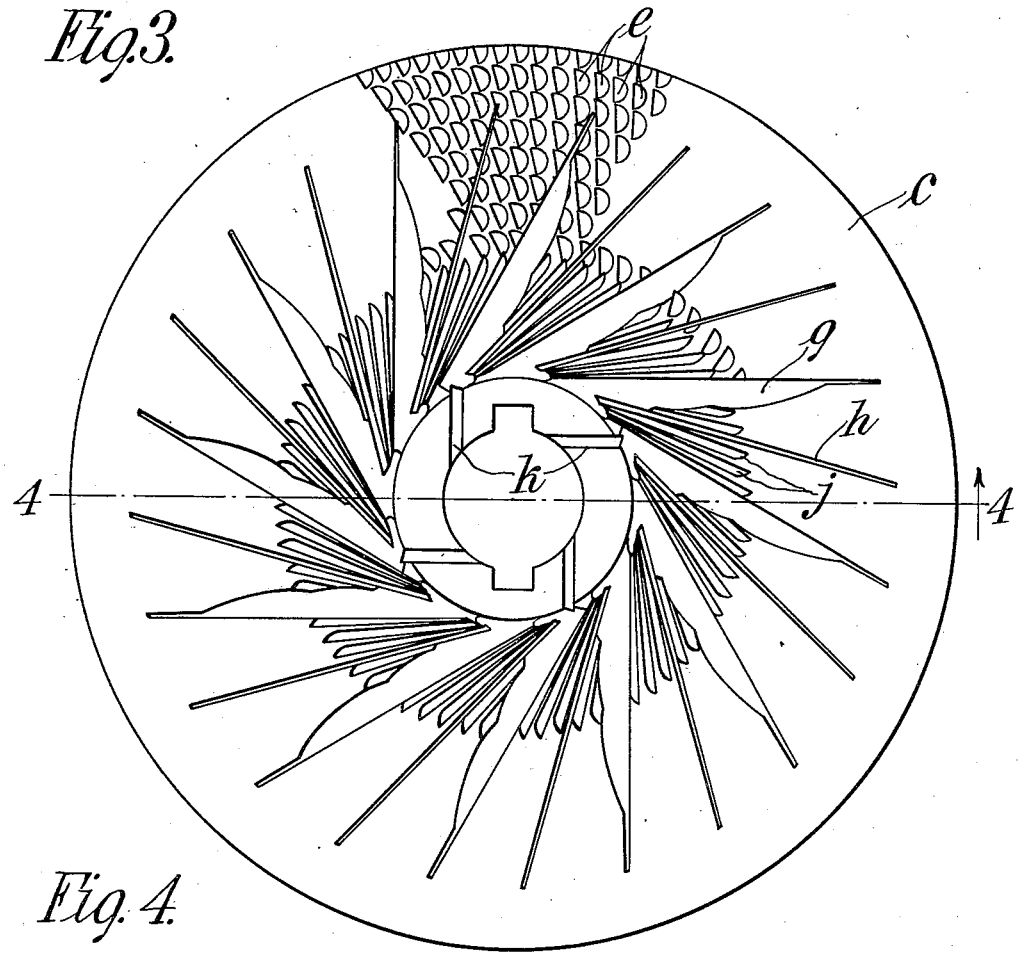
Figure 4:
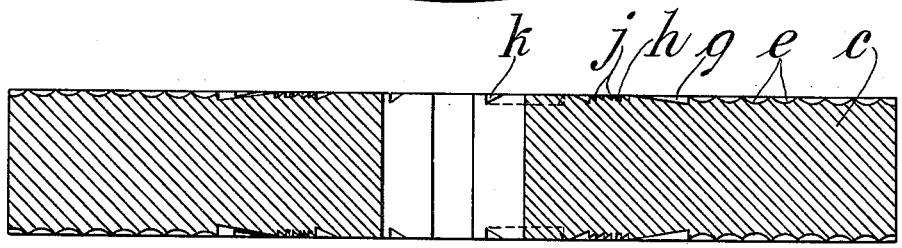
Figure 5:
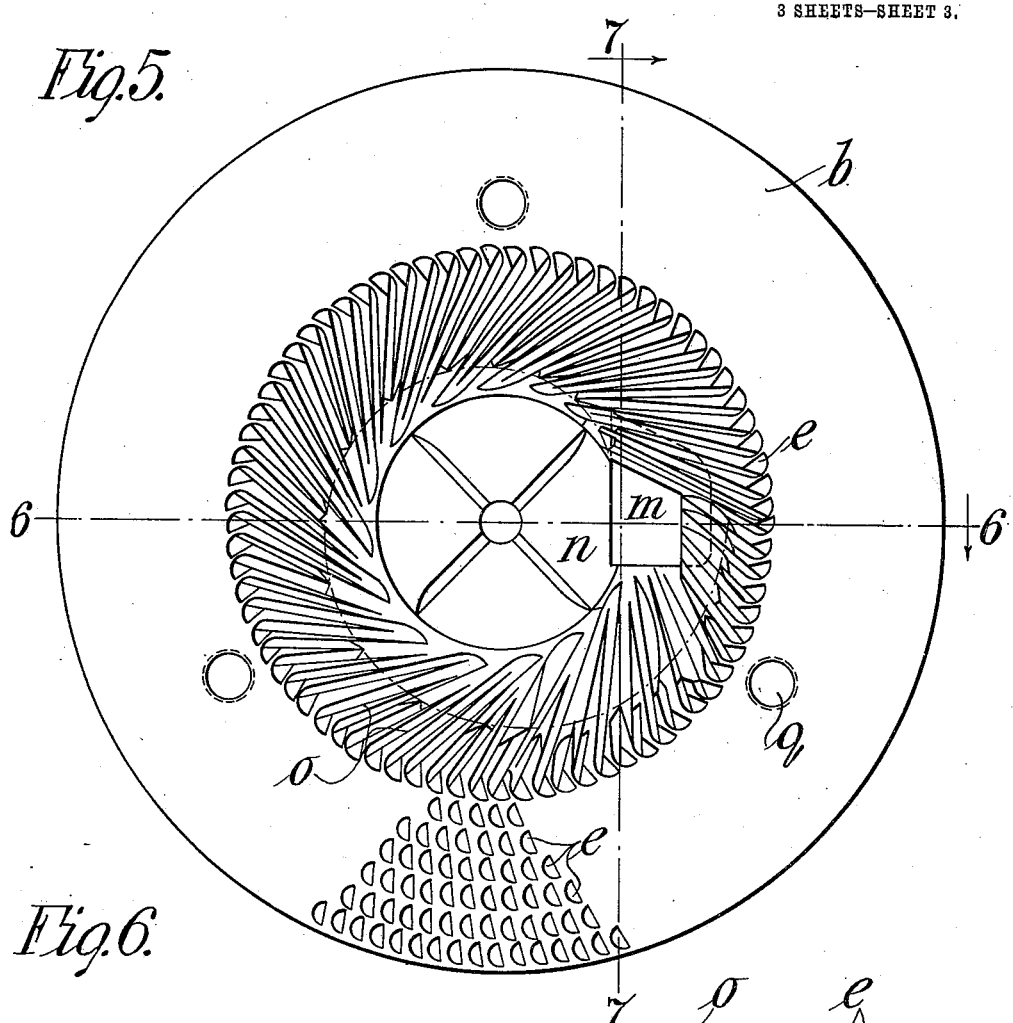
Figure 6:
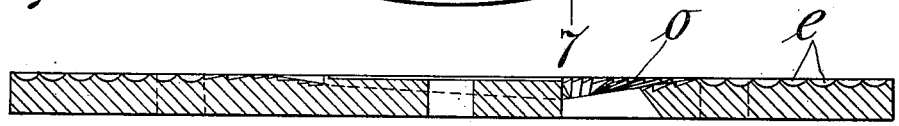
Figure 7:

Figure 1 is a cross-section of a grinding apparatus such as employs disks embodying my invention; Fig. 2 is a partial sectional view through two adjacent disks taken on line 2—2 of Fig. 1, showing the manner in which a part of the disks are arranged to reduce the bean; Fig. 3 is a plan view of the rotatable disk shown in Fig. 1; Fig. 4 is a sectional view taken on the line 4—4 of Fig. 3; Fig. 5 is a plan view of a stationary disk to coöperate with the rotatable disk; Fig. 6 is a section taken on line 6—6 of Fig. 5; and Fig. 7 is a partial section near the center of the disk taken on line 7—7 of Fig. 5.

Referring to Fig. 1, the rotatable disk $c$ is keyed to shaft $a$ and is rotated thereby. The stationary disks $b$—$b$ are arranged one opposite and adjacent each face of the disk $c$. The cocoa beans to be ground or reduced are fed to each side of the disk $c$ through the chutes $d$, and the beans enter through space $m$ shown in Figs. 5 and 7. After the beans are ground and reduced, they leave the disks at the outer circumference and fall into the sloping trough $s$. The shield $f$ arranged around the greater part of the circumference prevents the material leaving the apparatus at any other place than that immediately above the trough $s$. Contiguous to the entrance opening $m$, the disks $b$ have a converging circular recess, the depth of which decreases as the beans leave the opening $m$ and travel around the disk along the circular recess in a clockwise direction. This recess is indicated by a dotted and full line extending from the opening $m$ in Fig. 5. Extending along the bottom of this recess throughout its length, the cutting edges $o$, as shown in Figs. 1, 5, 6, and 7, are provided. These cutting edges are arranged to extend toward and at an angle to the radii of the disk. Cutting edges are also provided in the surface of the disk immediately outside of the recess described. At the center of the disk within the recess are provided cutting edges $n$ adapted to coöperate with cutting edges $k$ in the disks $c$. In an annular space around the outer edge of the disk are arranged several thousands of spoonlike recesses $e$ which are adapted to rub, pinch, and squeeze the cocoa bean prior to its leaving the apparatus. These spoonlike recesses have an effect similar to that described in connection with the recesses shown in my copending application, Serial No. 794,870, filed Oct. 13, 1913.

Figs. 1 and 2 indicate the manner in which the recesses in adjacent disks coöperate to rub and pinch the material after it has been ground.

The disks $b$ are designed to be stationary and may be fastened to any suitable part of the frame. The rotatable disk $c$ is shown in Fig. 3 and is adapted to be rotated by the shaft $a$. Immediately surrounding this shaft are cutting edges $k$. An annular space of the disk immediately surrounding the cutting edges $k$ is provided with cutting edges $j$ arranged at an angle to and extending toward the circumference of the disk. These cutting edges $j$ are divided into groups by means of longer cutting edges $h$ and feeding grooves $g$. These feeding grooves are deepest near the center of the disk and slope gradually upward toward the outer end thereof. The outer annular space of the disk $c$ is provided with spoonlike recesses $e$ similar to those shown in Fig. 5 and for the same purpose. The feeding grooves $g$ and the cutting edges $h$ extend for a short distance into the annular space provided with recesses $e$.

It will be seen that the cutting face of each disk $b$ will lie opposite and adjacent to one of the cutting faces of the disk $c$ when they are assembled as shown in Fig. 1. The cocoa beans enter through the opening $m$ and pass along the circular recess indicated in Fig. 5, and, as the disk $c$ rotates, the cutting edges $j$ coöperate with the cutting edges *o* with a scissorlike action to work the bean to a finer and finer condition until it leaves the converging recess and passes toward the circumference of the disk where the outer edges of the cutters *o* cut it still finer. The feeding grooves *g* allow the outward feeding operation freedom whereby the beans reach the reducing recesses *e* before they have received too much grinding. By the time the cocoa bean has entered in the recesses *e*, it has been reduced to a condition in which it can be rubbed and pinched instead of ground. The combination of the grinding means together with the pinching means, I believe to be broadly new.

In reducing the cocoa bean to prepare it for use in manufacturing chocolate, it is important not to grind the bean too much for the grinding process reduces the bean to a semi-liquid form containing cocoa oil, and, in this form, too much grinding will cause the material to be baked onto the surface of the disks in a hardened form which has been found to practically spoil the disk for any further use. This hardening or burning of the material will take place particularly where two flat surfaces are rotated with the material therebetween. For this reason the circular rows of recesses *e* on one face of a disk are staggered with relation to the rows on the adjacent face of the other disk, as clearly indicated in Fig. 1. By this arrangement the material may be forced outwardly from one row to another row at the same time being pinched and squeezed to reduce it in the desired manner. If the bean, after it has been reduced to a certain fineness is pinched, squeezed, and rubbed instead of ground, it will be reduced to a desired fineness without any difficulty.

What I claim is:

1. A grinding and reducing disk having a face provided with cutting and feeding grooves extending from the center toward the circumference and at an angle to the radii together with small semi-spoonlike recesses beyond the cutting and feeding grooves around the outer surface of the disk, one edge of said semi-spoonlike recesses being straight and inclined relatively to the radii of said disk.

2. A grinding and reducing apparatus comprising two disks relatively rotatable, each having its face provided near the center with cutting and feeding grooves said grooves being non-radial and adjacent grooves being non-parallel and near its circumference with small semi-spoonlike recesses, the bases of the recesses in one disk arranged reversely to the bases of the recesses in the adjacent disk, and said recesses arranged to partially overlie one another in radially staggered relation as they pass in the rotative movement.

3. A grinding and reducing apparatus comprising two disks relatively rotatable having opposite adjacent faces provided near the center with cutting and feeding grooves and near the circumference with small semi-spoonlike recesses arranged to partially overlie one another in radially staggered relation as they pass in the rotative movement the base edge of said recesses being non-radial and the base edges of adjacent grooves being non-parallel.

4. A grinding and reducing apparatus for chocolate, comprising in combination, relatively rotatable adjacent disks each provided on its adjacent surface with non-parallel and non-radial feeding and cutting grooves, said grooves being provided throughout an annular surface adjoining the center of the disk and the annular surface between said grooves and the circumference of the disk being provided with concentric sets of small spoonlike refining recesses, each having a straight line non-radial base, the concentric sets of the recesses in one disk being arranged in radially staggered relation to the concentric sets in the other disk to provide for the outward feeding of the material to be refined and avoid flat rubbing surfaces on the disks.

THEODOR KIHLGREN.

Witnesses:
F. G. NEAL,
H. E. HARTWELL.

---

Copies of this patent may be obtained for five cents each, by addressing the "Commissioner of Patents, Washington, D. C."